United States Patent Office 3,025,313
Patented Mar. 13, 1962

3,025,313
AMINO-ALDEHYDE CONDENSATION PRODUCT
Lewis O. Gunderson, Morton Grove, Ill., assignor to Dearborn Chemical Company, Chicago, Ill., a corporation of Illinois
No Drawing. Filed June 28, 1957, Ser. No. 668,598
4 Claims. (Cl. 260—404.5)

The present invention relates to new compositions of matter which find use in a variety of fields, including use as corrosion inhibitors in aqueous solutions, such as for the treatment of cooling tower water, cooling water for diesel engines and internal combustion engines, the treatment of injection water for secondary oil recovery, the treatment of producing oil wells, prevention of corrosion in oil storage tanks, pipe lines, and oil tankers, for the treatment of water in heat exchangers of all types and for the prevention of corrosion by industrial waters generally.

The compositions of the present invention also find use as oil and petroleum refined product additives in which they are employed as anti-oxidants, rust preventatives, sludge dispersants, and the like. Still another application for compositions of the present invention is the prevention of corrosion by brine used for de-icing city streets and for treating brine in railroad refrigerator cars to prevent corrosion of rails.

The compositions of the present invention and their salts or other derivatives may also be used as biocides to control bacteria, algae, nematodes, and other microorganisms.

Certain of the compositions of the present invention are also useful as emulsion breakers for oil field applications. Still others find use as flotation agents in ore refining, for metallic and non-metallic materials separation, and as anti-stripping agents for bonding asphalts to aggregates.

The major field of importance for the compositions of the present invention is the field of preventing corrosion in piping, containers, and other equipment associated with oil wells. The problem of corrosion is particularly severe in this field because the effluent in producing oil wells frequently is a severely corrosive mixture of brine and various petroleum products. These mixtures become even more corrosive in the presence of dissolved or dispersed corrosive gases, particularly hydrogen sulfide and/or carbon dioxide.

The problem of corrosion appears not only in the oil field but even after the petroleum products have been recovered and processed for the recovery of gasoline or refined oil. The refined products frequently cause corrosion in pipe lines through which they are pumped, or in storage tanks in which they are kept. Small amounts of acids which are picked up during the petroleum processing, or which are produced upon standing of the petroleum products contribute significantly to corrosive effects.

Accordingly, an object of the present invention is to provide compositions which have wide utility in the prevention of corrosion of metals by corrosive liquids.

Still another object of the invention is to provide compositions which inhibit corrosion in aqueous solutions containing hydrogen sulfide and/or carbon dioxide.

Still another object of the invention is to provide compositions which are useful as biocides, emulsion breakers, and flotation agents in addition to being useful as corrosion inhibitors.

Another object of the invention is to provide compositions which have excellent corrosion inhibiting properties but which can be manufactured at a lower cost than many presently employed corrosion inhibitors.

Still another object of the present invention is to provide methods for inhibiting corrosion by using the compositions of the present invention.

The compositions of the present invention may be characterized as a reaction product produced by reacting substantially equimolar amounts of (1) an amino compound having a hydrocarbon chain of at least 12 carbon atoms attached thereto and (2) an alkylene polyamine compound, with an aldehyde under conditions sufficient to form a condensation product in which compounds (1) and (2) are linked through the carbon atom of the CHO group of said aldehyde. The condensation with the aldehyde therefore, provides a means of linking two similar or dissimilar amino compounds to produce a compound having the proper balance between the hydrophobic and hydrophilic portions in the molecule. While I prefer to employ a total of about two molecular proportions of the amine compounds for every molecular proportion of aldehyde, equal molar ratios of the two may also be employed, as described more fully in a subsequent portion of this specification.

The amino compound mentioned above may be any of a wide variety of compounds. It may, for example, be a high molecular weight primary alkyl amine having at least twelve carbon atoms. It may be a secondary alkyl amine also having a hydrocarbon chain of at least twelve carbon atoms, or a byproduct of fatty amine manufacture such as the commercial product "Alamine 46," a product of General Mills, Inc. The amino compound may be an alkanol amine, or a cyclic or heterocyclic amine, as for example morpholine and N-(3-aminopropyl) morpholine, and N-(2-hydroxyethyl) morpholine, and N-(2-aminoethyl) morpholine, piperazine, piperazine compounds having amino, alkyl, or hydroxy alkyl substituents, rosin amines, imidazolines, and pyrimidines with alkyl polar substituents, and the like.

Particularly good results are obtained by employing as the amino compound, an alkyl substituted diamine or polyamine, for example the N-tallow trimethylene diamine or the N-coco trimethylene diamine. The two last-named materials are available commercially under the names "Diam 26" and "Diam 21" respectively.

The substituent on the amino compound may also be acyl as for example in the case of the compound N-oleoyl trimethylene diamine.

The alkylene polyamine compound may be a mono alkylene compound such as ethylene diamine, or propylene diamine, or it may be a polyalkylene polyamine such as diethylene triamine, triethylene tetramine, tetraethylene pentamine, dipropylene triamine, or other members of the polyalkylene polyamine family.

The aldehyde may be either aliphatic or aromatic, but is preferably an aldehyde which contains from one to nine carbon atoms per molecule. The preferred types of aldehydes are represented by formaldehyde, butyraldehyde, and aldol.

The two amino compounds (or two molecular proportions of the same alkyl amino compound) are condensed with the aldehyde under conditions sufficient to form a molecule of water by the reaction between the aldehyde group and the amino groups in the case of an amine compound to form an

linkage at the aldehyde carbon atom or to form an O—C—O linkage if the starting compounds are alkanol amines. The reaction should be carried out at relatively mild temperatures usually ranging from about room temperature to not more than 80° C. in order to prevent cyclization of the amine compound into a heterocyclic molecule.

The following examples illustrate representative compounds which have corrosion inhibiting effectiveness, and produced according to the present invention.

(1) Reaction product of 2 mols of N-tallow trimethylene diamine with 1 mol of aldol:

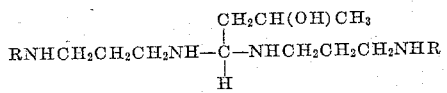

R=tallow acid residue (2) Reaction product of 2 mols of N-acyl trimethylene diamine with 1 mol of aldol:

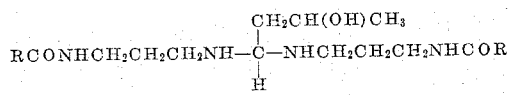

R=hydrocarbon radical containing at least 12 carbon atoms (e.g., oleyl)

(3) Reaction product of 1 mol of octadecenyl trimethylene diamine with 1 mol of amino ethylethanolamine and 1 mol of formaldehyde:

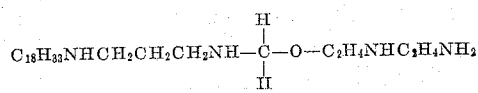

(4) Reaction product (3) reacted with a naphthenic acid:

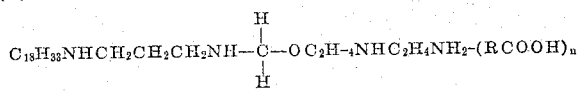

R=naphthenic acid radical
n=an integer from 1 to 4

(5) Reaction product of 1 mol of an N-alkyl trimethylene diamine with 1 mol of diethylene triamine and 1 mol of an aldehyde:

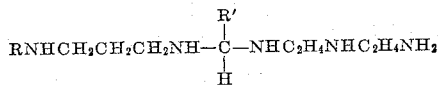

R=alkyl group of at least 12 carbon atoms
R'=residue from the aldehyde.

(6) Reaction product of 1 mol of an N-alkyl aminoethyl ethanol amine with 1 mol of aminoethyl ethanol amine and 1 mol of formaldehyde:

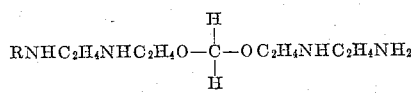

R=alkyl group of at least 12 carbon atoms (7) Reaction of 2 mols of an N-acyl aminoethyl ethanol amine with 1 mol of an aldehyde:

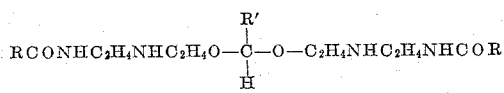

R=acyl group of at least 12 carbon atoms
R'=residue from the aldehyde (8) Reaction product of 1 mol of an alkyl imidazoline with 1 mol of diethylene triamine and 1 mol of an aldehyde.

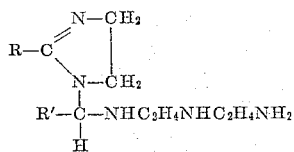

R=alkyl group of at least 12 carbon atoms
R'=residue from the aldehyde (9) Reaction product of 1 mol of 1-hydroxyethyl, 2-heptadecyl imidazoline with one mol of tallow trimethylene diamine and 1 mol of formaldehyde:

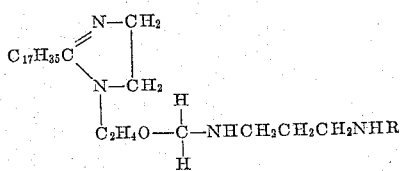

R=tallow acid residue

(10) Reaction product of 2 mols of 1-hydroxyethyl, 2-heptadecyl imidazoline with 1 mol of formaldehyde:

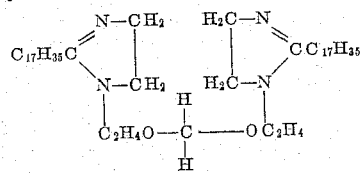

(11) Reaction product of 2 mols of 2-heptadecyl 1-aminoethyl imidazoline with 1 mol of an aldehyde:

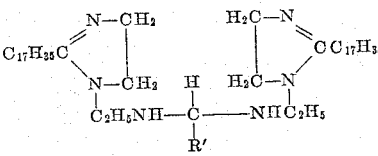

R'=residue from the aldehyde

(12) Reaction product of 1 mol of an alkyl secondary amine (e.g. "Diam 26") with 1 mol of diethylene triamine and 1 mol of an aldehyde, said reaction product being further reacted with a carboxylic acid to produce the salt:

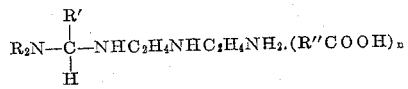

R=alkyl group of at least 12 carbon atoms
R'=residue from the aldehyde
R''=aliphatic group of 11 to 18 carbon atoms
n=integer from 1 to 4

(13) Reaction product of 1 mol of maleuric acid with 1 mol of N-tallow trimethylene diamine and 1 mol of formaldehyde:

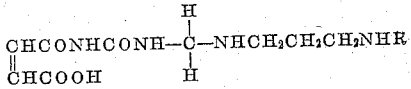

R=tallow acid residue.

(14) Reaction product of 1 mol of dodecyl maleurate with 1 mol of N-coco trimethylene diamine and 1 mol of formaldehyde:

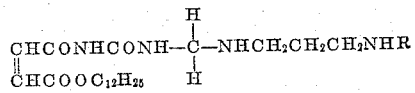

R=coco acid residue

As indicated in the foregoing examples, the reaction products may be further reacted with carboxylic acids to produce the salts which in most cases improve the corrosion inhibiting effectiveness of the compounds. Generally, carboxylic acids having between 2 and 20 carbon atoms per molecule are employed, and preferably those having 11 to 18 carbon atoms per molecule. To produce the salt, the reaction product may be combined with from one to four molecular proportions of the carboxylic acid and maintained at a temperature substantially in excess of the melting point of the carboxylic acid until the salt formation occurs.

The foregoing examples are to be considered as typical of the compounds which come within the scope of the present invention. Other aldehydes can be substituted for the formaldehyde employed in many of the compounds in the examples, and other types of amines and polyamines can be substituted for the specific amino compounds given. In all instances, however, it is important that the two amino compounds be reacted with the aldehydes under conditions sufficient to link the two compounds into a single molecule through the carbon atom of the aldehyde group.

The following examples represent typical procedures for manufacturing the compounds, and also indicate their effectiveness in standard corrosion inhibiting tests.

*Example I*

40 grams (0.1 mol) of tallow trimethylene diamine and 10 grams (0.1 mol) of diethylene triamine were melted together at 100° F. and 9 grams (0.1 mol) of 37% formaldehyde were added slowly with stirring. The temperature rose to about 168° F.

The reaction product was tested in a dynamic sour crude test modified to simulate injection water conditions in secondary oil recovery systems. In this test, steel coupons are suspended on a spindle and immersed in a test solution having the following composition:

| | | |
|---|---|---|
| Distilled water | gallons | 5 |
| NaCl | grams | 700 |
| $CaCl_2$—$2H_2O$ | do | 20 |
| $MgCl_2$—$6H_2O$ | do | 10 |
| $NaHCO_3$ | do | 35 |
| $Na_2SO_4$ | do | 2 |
| 4N NaOH | cc | 17 |
| pH | | 8.0±0.1 |

The test coupons are partly immersed in the test solution and revolved at a rate of about 200 revolutions per minute, causing the solution to become aerated.

A small fraction of a percent of the amine-aldehyde reaction product when added to the test solution, provided almost complete inhibition of corrosion even after extended exposure of the test coupons to the highly corrosive environment. In contrast, identical test coupons when subjected to the test solution without the inhibitor corroded very rapidly.

The same improved results can be verified on the basis of a simple laboratory test employing ordinary tap water. Separate beakers half filled with tap water were provided, and into each there was immersed a standard steel corrosion coupon. The beakers were allowed to stand in open air. Some of the beakers contained no corrosion inhibitors, others contained standard corrosion inhibitors, and still others contained the improved amine-aldehyde condensate. Both the beakers containing no inhibitor and those containing the standard inhibitors exhibited serious corrosion of the steel coupons whereas there was no visible sign of corrosion on the coupons immersed in the amine-aldehyde condensation product even after eight days of exposure under the corrosive conditions.

*Example II*

The reaction product of Example I was further reacted with 29 grams (0.1 mol) of red oil (consisting predominantly of unrefined oleic acid) and 12 grams (0.2 mol) of acetic acid to produce a salt of the product.

The resulting salt was tested in a standard sweet crude test method conducted as follows:

A coupon measuring 1 inch by 1 inch by $\frac{1}{16}$ inch was suspended in a one liter flask. Before starting the test, 100 cc. of kerosene were placed in the bottom of the flask and the inhibitor to be tested was added at dosages ranging from 10 to 100 parts per million based upon the final volume of fluid. 900 cc. of 5% sodium chloride brine containing 500 parts per million of hydrogen sulfide were then run in under the kerosene. The coupon was then inserted in the flask holding it in the kerosene layer for 10 seconds after which it was allowed to hang in the water layer. All operations were performed under a stream of nitrogen, and the flask, after being stoppered under nitrogen, was allowed to stand for one week. At that time the metal coupons were removed, inspected, cleaned and weighed in order to determine the weight loss due to corrosion. The weight loss was compared with that shown by similar coupons suspended in an uninhibited brine, and the results are reported in terms of percent inhibition.

When the reaction product salt of this example was tested in the foregoing method, it was found to give 82% inhibition.

*Example III*

Thirty-two grams of N-coco trimethylene diamine and 10 grams of diethylene triamine were mixed and melted together at a temperature of 82° F. A 37% aqueous formaldehyde solution was added with stirring, with a total of 18 grams being added. The temperature rose to 189° F. during this addition. Two layers were formed when the mixture was allowed to cool. The lower layer was a water layer formed from the water in the formaldehyde together with a certain amount of water produced in the condensation between the aldehyde and the amine. The condensate proved to be an excellent corrosion inhibitor for sweet oil wells and as a vapor phase inhibitor.

In this example, the molar ratio of the two amino compounds to the formaldehyde was substantially 1:1:2. Apparently, some lower polymers were formed in the condensation, but the product nevertheless was a good corrosion inhibitor.

*Example IV*

Thirty-eight grams (0.1 mol) of an amine by-product of fatty amine manufacture (identified commercially as "Alamine 46" by General Mills, Inc.) and 10 grams (0.1 mol) of diethylene triamine were mixed and heated to 120° F. to melt them. Six grams (0.1 mol) of glyoxal were added slowly with stirring. The reaction mixture was heated to 247° F., cooled, and 29 grams (0.1 mol) of "red oil" (unrefined oleic acid) and 6 grams (0.1 mol) acetic acid were added. The product was a brown paste, soluble in isopropanol and dispersible in water. The reaction product evidenced a corrosion inhibiting effectiveness of 68.2% in the standard sweet crude test method.

*Example V*

Forty grams of N-tallow trimethylene diamine were reacted with 10 grams of diethylene triamine and 13.5 grams of a 37% formaldehyde solution in the manner described in the previous examples. The molar ratio of the reactants in the order mentioned was approximately 1:1:1.5. The temperature of the reaction rose to 203° F. The product was a thick brown liquid suitable for use in inhibiting sweet well corrosion.

*Example VI*

Forty grams (0.1 mol) of N-tallow trimethylene diamine were reacted with 9 grams of 37% formaldehyde (0.11 mol) to produce a reaction product at a temperature of 194° F. The composition which resulted showed effective corrosion inhibition in the N.A.C.E. sour well test and also was quite effective as a corrosion inhibitor in injection water for secondary recovery.

*Example VII*

In contrast to the foregoing examples, an unsubstituted polyamine was condensed with formaldehyde in the following manner. Ten grams (0.1 mol) of diethylene triamine were reacted with 9 grams of 37% formaldehyde (0.11 mol) at a reaction temperature of 194° F. The reaction product was a colorless liquid which had no apparent corrosion inhibiting effectiveness.

The dosage levels to be employed for the compounds of the invention will, of course, vary with the type of system in which the compounds are introduced. For the treatment of oil well liquids, the dosage level would normally be on the order of ten parts per million to 200 parts per million or more. In enclosed cooling systems such as cooling systems for diesel engines, the proportion of the inhibitor may be as high as 1% or more of the liquid being circulated.

In use, the corrosion inhibiting compounds of the present invention apparently provide an extremely thin protective film on the surfaces of the metal as the liquid medium containing the inhibitor is circulated past the surfaces. Even though the dimensions of the film are extremely thin, and indeed the film may not even be continuous in all cases, the compositions of the present invention provide excellent resistance to corrosion for the metallic surfaces.

It will be evident that various modifications can be made to the described embodiments without departing from the scope of the present invention.

I claim as my invention:

1. A composition of matter having the general formula

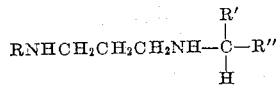

wherein R' is selected from the class consisting of H, $C_1$–$C_8$ alkyl and monohydroxy $C_1$–$C_8$ alkyl; R" is selected from the class consisting of

and poly $C_2$–$C_3$ alkylene polyamino-; and R is selected from the class consisting of $C_{12}$–$C_{18}$ alkyl, $C_{12}$–$C_{18}$ fatty acyl and H (R'''COOH$_n$ wherein $n$ is an integer from 1 to 4 and R'''COOH is naphthenic acid.

2. A composition of matter having the formula

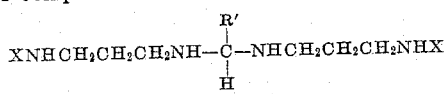

wherein R' is selected from the class consisting of H, $C_1$–$C_8$ alkyl and monohydroxy $C_1$–$C_8$ alkyl and X is a tallow acid residue.

3. A composition of matter having the formula

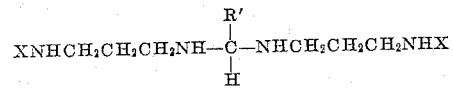

wherein R' is selected from the class consisting of H, $C_1$–$C_8$ alkyl and monohydroxy $C_1$–$C_8$ alkyl and each X is a $C_{12}$–$C_{18}$ alkyl group.

4. A composition of matter having the formula

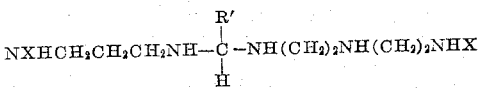

wherein R' is selected from the class consisting of H, $C_1$–$C_8$ alkyl and monohydroxy $C_1$–$C_8$ alkyl and X is a tallow acid residue.

References Cited in the file of this patent
UNITED STATES PATENTS

| | | |
|---|---|---|
| 1,952,008 | Bruson | Mar. 20, 1934 |
| 2,276,309 | Hummel et al. | Mar. 17, 1942 |
| 2,297,864 | Krefeld | Oct. 6, 1942 |
| 2,731,498 | Walter | Jan. 17, 1956 |
| 2,755,166 | Marsh | July 17, 1956 |
| 2,784,226 | Brown | Mar. 5, 1957 |
| 2,793,932 | Kahler et al. | May 28, 1957 |